US012618935B2

(12) United States Patent
Si et al.

(10) Patent No.: US 12,618,935 B2
(45) Date of Patent: May 5, 2026

(54) POSITIONING PROCESSING METHOD, TERMINAL AND NETWORK SIDE DEVICE

(71) Applicant: VIVO MOBILE COMMUNICATION CO., LTD., Dongguan (CN)

(72) Inventors: Ye Si, Dongguan (CN); Yuanyuan Wang, Dongguan (CN); Zixun Zhuang, Dongguan (CN); Huaming Wu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 318 days.

(21) Appl. No.: 18/506,997

(22) Filed: Nov. 10, 2023

(65) Prior Publication Data

US 2024/0077571 A1     Mar. 7, 2024

Related U.S. Application Data

(63) Continuation of application No. PCT/CN2022/091462, filed on May 7, 2022.

(30) Foreign Application Priority Data

May 11, 2021     (CN) .......................... 202110512041.9

(51) Int. Cl.
   *H04Q 7/20*          (2006.01)
   *G01S 5/02*          (2010.01)
   *H04W 64/00*        (2009.01)
(52) U.S. Cl.
   CPC ........... *G01S 5/0244* (2020.05); *H04W 64/00* (2013.01)
(58) Field of Classification Search
   CPC ... H04W 64/00; H04W 64/003; H04W 72/04;

H04W 72/1268; H04W 72/21; H04W 72/231; H04W 72/25; H04W 72/30; G01S 5/0244; G01S 5/06; G01S 5/14
See application file for complete search history.

(56) References Cited

U.S. PATENT DOCUMENTS

| | | | |
|---|---|---|---|
| 11,258,533 B2 * | 2/2022 | Jia .......................... | H04L 1/0004 |
| 2020/0267672 A1 | 8/2020 | Chien et al. | |
| 2022/0322267 A1 * | 10/2022 | Bao ........................ | G01S 5/0036 |
| 2024/0007994 A1 * | 1/2024 | Si ........................ | H04W 56/005 |
| 2024/0155550 A1 * | 5/2024 | Dai ........................ | G01S 13/765 |

OTHER PUBLICATIONS

International Search Report issued in corresponding International Application No. PCT/CN2022/091462, mailed Jul. 25, 2022, 4 pages.
MODERATORCATT, "FL Summary #4 for Accuracy Improvements by Mitigating UE RX/TX and/or gNB Rx/Tx Timing Delays", 3GPP TSG RAN WG1 Meeting #104bis-e R1-2103992, Apr. 2021, 86 pages.
VIVO, "Discussion on Methods for Rx/Tx Timing Delay Mitigating", 3GPP TSG RAN WG1 #104b-e R1-2102526, Apr. 2021, 15 pages.

* cited by examiner

*Primary Examiner* — Tuan Pham
(74) *Attorney, Agent, or Firm* — IPX PLLC

(57) ABSTRACT

The application discloses a positioning processing method, a terminal and a network side device. The positioning processing method includes: sending, by a terminal, first indication information, where the first indication information is used to indicate at least one of the following: an association between a reference signal for uplink positioning and a timing error group (TEG); or an association between a positioning measurement result and the TEG.

18 Claims, 5 Drawing Sheets

A terminal sends first indication information; where the first indication information is used to indicate at least one of the following:
association between a reference signal for uplink positioning and a timing error group TEG; and association between a positioning measurement result and a TEG.

301

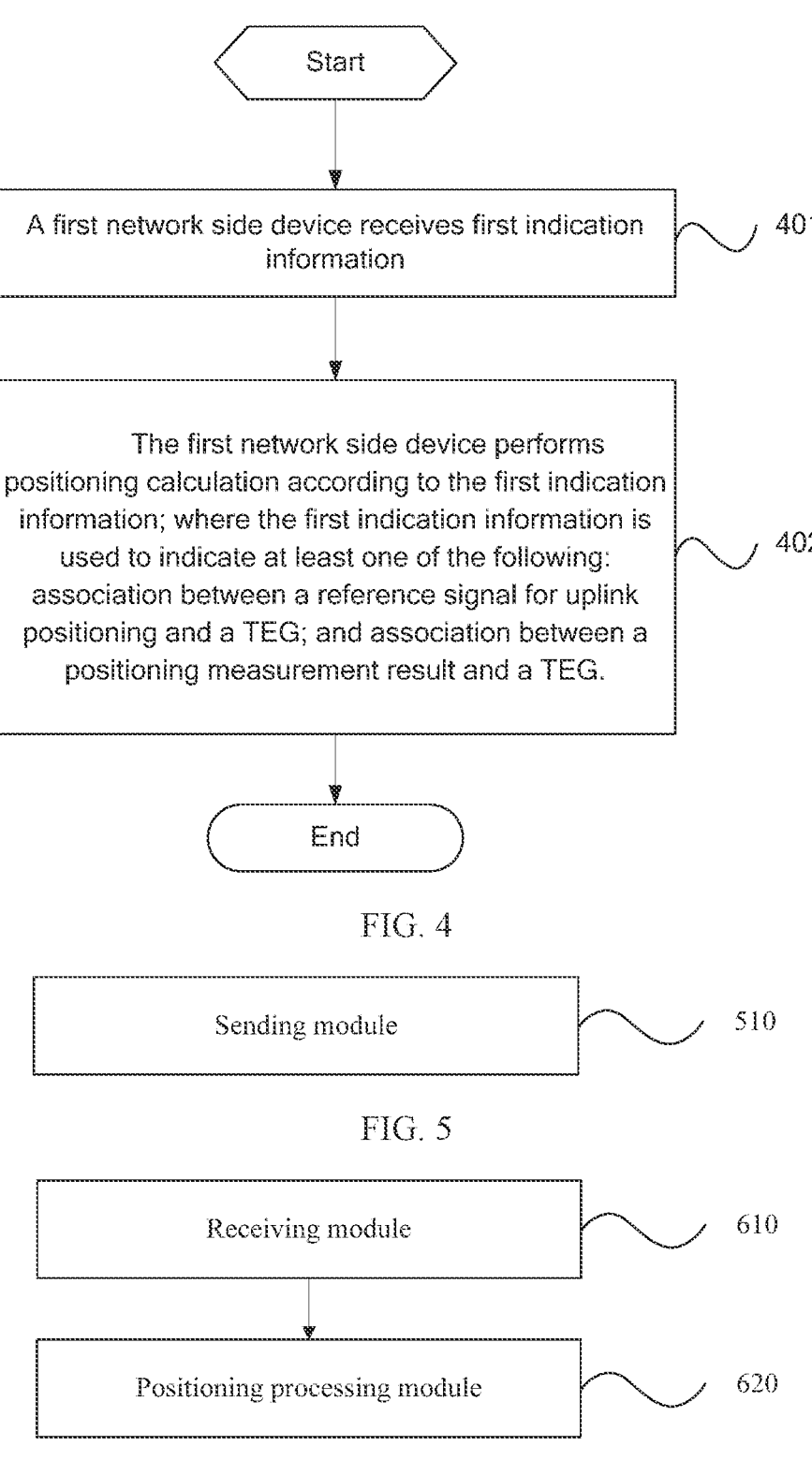

Start

A first network side device receives first indication information — 401

The first network side device performs positioning calculation according to the first indication information; where the first indication information is used to indicate at least one of the following: association between a reference signal for uplink positioning and a TEG; and association between a positioning measurement result and a TEG. — 402

End

FIG. 4

Sending module — 510

FIG. 5

Receiving module — 610

Positioning processing module — 620

POSITIONING PROCESSING METHOD, TERMINAL AND NETWORK SIDE DEVICE

CROSS-REFERENCE TO RELATED APPLICATIONS

This application is a continuation of International Application No. PCT/CN2022/091462, filed May 7, 2022, which claims priority to Chinese Patent Application No. 202110512041.9, filed May 11, 2021. The entire contents of each of the above-referenced applications are expressly incorporated herein by reference.

TECHNICAL FIELD

The present application relates to the technical field of communications, and in particular relates to a positioning processing method, a terminal, and a network side device.

BACKGROUND

For positioning methods based on time measurement, for example, Round Trip Time based (RTT-based) positioning methods and Time Difference of Arrival based (TDOA-based) positioning methods, when calculating the location of User Equipment (UE), the positioning accuracy is affected by a Transmission Reference Point (TRP) and a receiving/transmitting timing error (Rx/Tx timing error) of the UE.

Taking the RTT-based positioning method as an example, the impact of Rx/Tx timing error on positioning is shown in FIG. 1.

An Rx-Tx measurement value of the receiving/transmitting timing error between UE and TRP can be written as:

$$(Rx-Tx)_{UE}=t_1-t_2$$

$$(Rx-Tx)_{TRP}=t_3-t_0$$

wherein, $t_1$ is a time of receiving a Downlink Positioning Reference Signal (DL PRS) by the UE from the TRP, $t_2$ is a time of sending a Sounding Reference Signal (SRS), $t_3$ is a time of receiving an SRS from the TRP, and $t_0$ is a time of sending a DL PRS.

The RTT value between UE and TRP can be calculated as:

$$RTT_{meas}=(Rx-Tx)_{TRP}+(Rx-Tx)_{UE}=t_3-t_0+t_1-t_2=t_1-t_0+t_3-t_2$$

However, all of the above sending and receiving times are obtained from baseband, and consist of actual propagation delay and Rx/Tx timing error as follows:

$$RTT_{meas}=2*T_{prop}+(e_0+e_3)+(e_1+e_2)=2*T_{prop}+e_{TRP}+e_{UE}$$

wherein, $T_{prop}$ is the actual propagation delay between UE and TRP, $e_0$ is a transmission timing error (Tx timing error) of TRP, $e_3$ is the receiving timing error (Rx timing error) of TRP, $e_1$ is the RN, timing error of the UE, $e_2$ is the Tx timing error of the UE, $e_{TRP}$ is a total timing error including $e_0$ and e3 on the TRP side, and cur is a Inning error including $e_1$ and $e_2$ on the UE side.

Due to the impact of Rx/Tx timing, RTT-based positioning will be affected. Similarly, other time-based positioning methods will also will be affected, Therefore, how to eliminate the Rx/Tx timing error and improve the positioning accuracy has become an urgent problem in the current positioning technology.

SUMMARY

Embodiments of the present application provide a positioning processing method, a terminal, and a network side device.

According to a first aspect, a positioning processing method is provided, including:

sending, by a terminal, first indication information;

where the first indication information is used to indicate at least one of the following:

association between a reference signal for uplink positioning and a timing error group TEG; or association between a positioning measurement result and a TEG.

According to a second aspect, a positioning processing apparatus is provided, including:

a sending module, configured to send first indication information;

where the first indication information is used to indicate at least one of the following:

association between a reference signal for uplink positioning and a timing error group TEG; or association between a positioning measurement result and a TEG.

According to a third aspect, a location processing method is provided, including:

receiving, by a first network side device, first indication information; and performing, by the first network side device, positioning calculation according to the first indication information;

where the first indication information is used to indicate at least one of the following:

association between a reference signal for uplink positioning and a TEG; or association between a positioning measurement result and a TEG.

According to a fourth aspect, a positioning processing apparatus is provided, including:

a receiving module, configured to receive first indication information; and a positioning processing module, configured to perform positioning calculation according to the first indication information;

where the first indication information is used to indicate at least one of the following:

association between a reference signal for uplink positioning and a TEG; or association between a positioning measurement result and a TEG.

According to a fifth aspect, a terminal is provided. The terminal includes a processor, a memory, and a program or an instruction that is stored in the memory and that can be run on the processor, where the program or the instruction is executed by the processor to implement the steps of the method in the first aspect.

According to a sixth aspect, a terminal is provided, including a communication interface, where the communication interface is configured to send first indication information;

where the first indication information is used to indicate at least one of the following:

association between a reference signal for uplink positioning and a timing error group TEG; or association between a positioning measurement result and a TEG.

According to a seventh aspect, a network side device is provided. The network side device includes a processor, a memory, and a program or an instruction that is stored in the memory and that can be run on the processor, where the program or the instruction is executed by the processor to implement the steps of the method in the third aspect.

According to an eighth aspect, a network side device is provided, including a processor and a communication interface, where the communication interface is configured to receive first indication information; and the processor is used to perform positioning calculation according to the first indication information;

where the first indication information is used to indicate at least one of the following:

association between a reference signal for uplink positioning and a TEG; or association between a positioning measurement result and a TEG.

According to a ninth aspect, a readable storage medium is provided, where a program or an instruction is stored on the readable storage medium, and the program or the instruction is executed by a processor to implement the steps of the method in the first aspect or the steps of the method in the third aspect.

According to a tenth aspect, a chip is provided, where the chip includes a processor and a communication interface, the communication interface is coupled to the processor, and the processor is configured to run a program or an instruction to implement the method in the first aspect or the method in the third aspect.

According to an eleventh aspect, a computer program/program product is provided, where the computer program/program product is stored in a storage medium, and the program/program product is executed by at least one processor to implement the steps of the method as described in the first aspect or the method as described in the third aspect.

In this embodiment of the present application, the terminal sends the first indication information to the first network side device, so that the first network side device can know the association between the reference signal for uplink positioning and the TEG, and/or the association between the positioning measurement result and the TEG, and eliminate the Rx/Tx timing error based on the correlation during positioning, so as to improve the positioning accuracy.

BRIEF DESCRIPTION OF DRAWINGS

FIG. 4 is a schematic diagram 2 of a positioning processing method according to an embodiment of the present application;

FIG. 5 is a structural diagram of an apparatus corresponding to FIG. 3;

FIG. 6 is a structural diagram of an apparatus corresponding to FIG. 4;

DETAILED DESCRIPTION

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application shall fall within the protection scope of this application.

The terms "first", "second", and the like in this specification and claims of this application are used to distinguish between similar objects instead of describing a specific order or sequence. It should be understood that, the terms used in such a way is interchangeable in proper circumstances, so that the embodiments of this application can be implemented in an order other than the order illustrated or described herein. Objects classified by "first" and "second" are usually of a same type, and the number of objects is not limited. For example, there may be one or more first objects. In addition, in the description and the claims, "and/or" represents at least one of connected objects, and a character "/" generally represents an "or" relationship between associated objects.

It is worth noting that the technology described in the embodiment of this application is not limited to the Long Term Evolution (LTE)/LTE-Advanced (LTE-A) system. It can also be applied in various wireless communication systems such as Code Division Multiple Access (CDMA), Time Division Multiple Access (TDMA), Frequency Division Multiple Access (FDMA), Orthogonal Frequency Division Multiple Access (OFDMA), Single-carrier Frequency-Division Multiple Access (SC-FDMA) and other systems. The terms "system" and "network" in the embodiments of this application may be used interchangeably. The technologies described can be applied to both the systems and the radio technologies mentioned above as well as to other systems and radio technologies. A New Radio (NR) system is described below as an example, and the term, NR, is used in most of the descriptions, but these technologies can also be used in an application other than an application of the NR system, for example, a $6^{th}$ Generation (6G) communications system.

Figure 1:
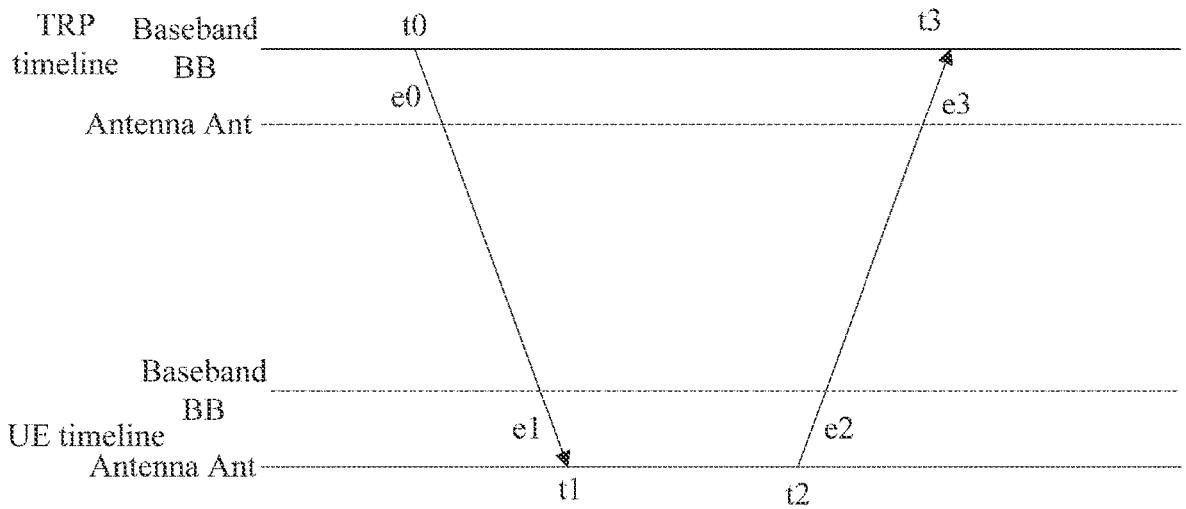
FIG. 1 is a schematic diagram of a timing error in existing positioning calculation.
Figure 2:
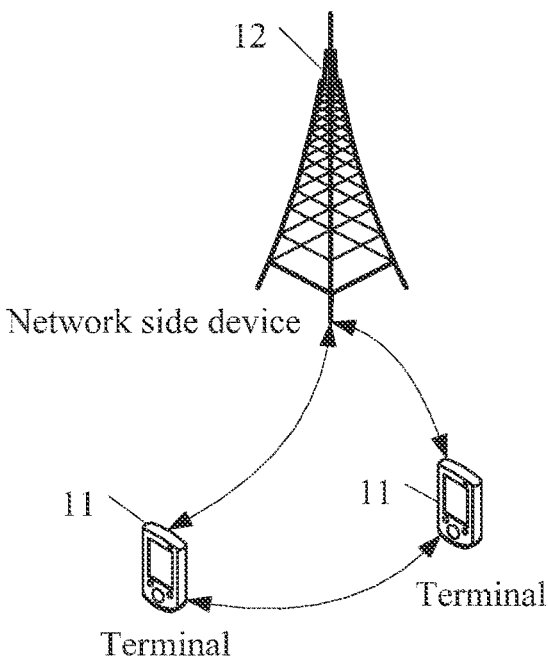
FIG. 2 is a block diagram of a wireless communication system according to an embodiment of the present application.

FIG. 2 is a block diagram of a wireless communication system to which embodiments of this application can be applied. The wireless communications system includes a terminal 11 and a network side device 12. The terminal 11 may also be referred to as a terminal device or UE. The terminal 11 may be a terminal side device such as a mobile phone, a tablet personal computer, a laptop computer or a notebook computer, a personal digital assistant (PDA), a palmtop computer, a netbook, an ultra-mobile personal computer (UMPC), a mobile internet device (MID), a wearable device, vehicle user equipment (VUE), or pedestrian user equipment (PUE). The wearable device includes a smartwatch, a bracelet, a headset, glasses, and the like. It should be noted that a specific type of the terminal 11 is not limited in the embodiments of this application. The network side device 12 may be a base station or a core network device. The base station may be referred to as a node B, an evolved node B, an access point, a base transceiver station (BTS), a radio base station, a radio transceiver, a basic service set (BSS), an extended service set (ESS), a node B, an evolved node B (eNB), a home node B, a home evolved node B, a wireless local area network (WLAN) access point, a WiFi node, a transmitting receiving point (TRP), or other appropriate terms in the art. As long as a same technical effect is achieved, the base station is not limited to a specified technical term. It should be noted that, in embodiments of the present application, only a base station in the NR system is used as an example, but a specific type of the base station is not limited.

Tx timing error: From the perspective of signal transmission, there is a time delay from a time when a digital signal is generated in a baseband to a time when an RF signal is sent from a Tx antenna. To support positioning, UE/TRP can implement internal calibration/compensation of a Tx time delay for the transmission of DL PRS/UL SRS signals. The remaining Tx time delay after calibration or the uncalibrated Tx time delay is defined as a Tx timing error. From the figure above, the Tx timing error on the UE side can be understood as the time from BB to Ant in the light blue part.

Rx timing error: From the perspective of signal reception, there is a time delay from reception of the RF signal by the Rx antenna to baseband processing. In order to support positioning, UE/TRP can perform internal calibration/compensation of a Rx time delay on a measurement result of DL PRS/UL SRS before reporting the measurement. The remaining Rx time delay after calibration or the uncalibrated Rx time delay is defined as a Rx timing error. From the figure above, the Rx tuning error on the UE side can be understood as the time from Ant to BB in the light blue part.

UE Tx 'timing error group' (UE Tx TEG): UE Tx TEG is associated with the transmission of one or more UL SRS resources used for positioning, and the Tx timing error of these resources is within a certain range. From the discussion, it is considered that the SRS sent by the same Tx panel can be associated with the same UE Tx TEG.

TRP Tx 'timing error group' (TRP Tx TEG): TRP Tx TEG is associated with the transmission of one or more DL PRS resources, and the Tx timing error of these resources is within a certain range. From the discussion, it is considered that the PRS sent by the same Tx panel can be associated with the same TRP Tx TEG.

UE Rx 'timing error group' (UE Rx TEG): UE Rx TEG is associated with one or more DL measurements, and the Rx timing error of the measurements is within a certain range. From the discussion, it is considered that for the PRS measured by the same Rx panel, the PRS measurement result can be associated with the same UE Rx TEG.

TRP Rx 'timing error group' (TRP Rx TEG): TRP Rx TEG is associated with one or more UL measurements, and the Rx timing error of these measurements is within a certain range. From the discussion, it can be considered that for the SRS measured by the same Rx panel, the SRS measurement result can be associated with the same TRP Tx TEG.

UE RxTx 'timing error group' (UE RxTx TEG): The UE RxTx TEG is associated with one or more UE Rx-Tx time difference measurements and one or more UL SRS resources, and "Rx timing error+Tx timing error" of the resources is within a certain range.

TRP RxTx 'timing error group' (TRP RxTx TEG): The TRP RxTx TEG is associated with one or more gNB Rx-Tx time difference measurements and one or more DL PRS resources, and "Rx timing Error+Tx timing error" of the resources is within a certain range.

The positioning processing method provided by the embodiment of the present application will be described in detail below through some embodiments and application scenarios with reference to the accompanying drawings.

Figure 3:
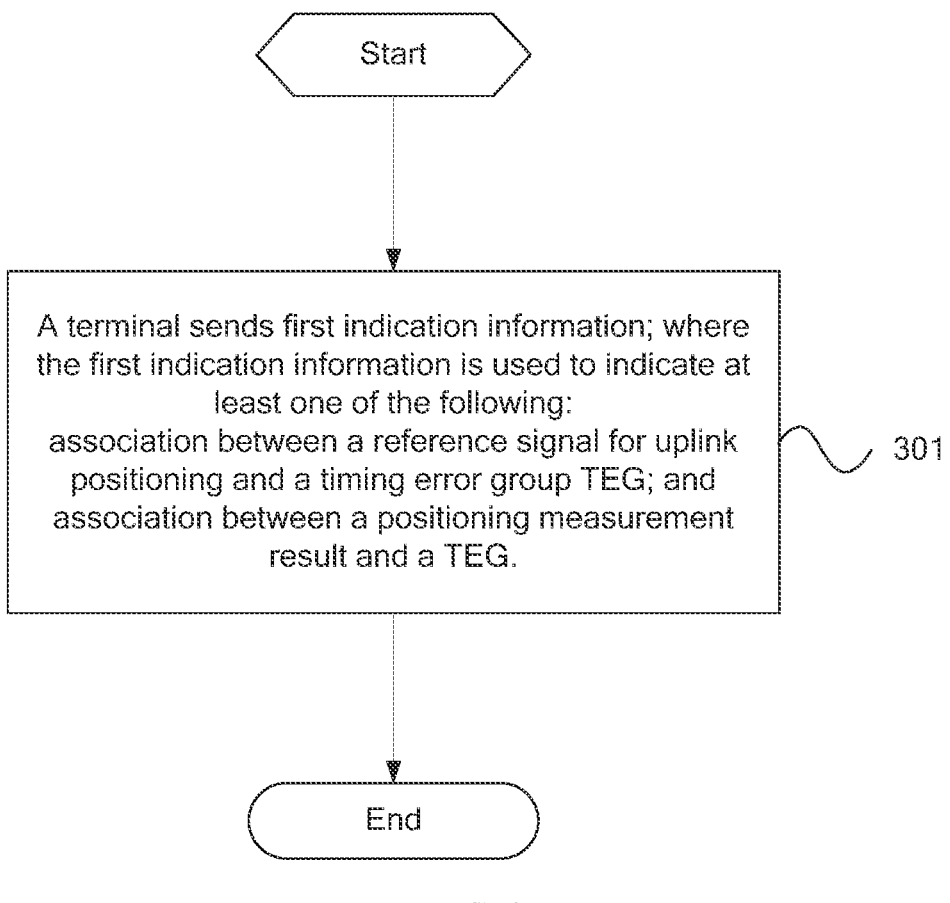
FIG. 3 is a schematic diagram 1 of a positioning processing method according to an embodiment of the present application.

As shown in FIG. 3, the positioning processing method of the embodiment of the present application includes:

Step 301: A terminal sends first indication information.

The first indication information is used to indicate at least one of the following:

association between a reference signal for uplink positioning and a Timing Error Group (TEG); or
    association between a positioning measurement result and a TEG.

The reference signal for uplink positioning includes but is not limited to at least one of the following: an SRS for positioning, an SRS for MIMO, or a Physical Random Access Channel (PRACH) and so on. A positioning measurement result includes but is not limited to at least one of the following: measurement results related to a DownLink Reference Signal Time Difference (DL RSTD), a UE Rx-Tx time difference measurement result, or a DownLink Angle of Departure (DL-AOD).

In this way, the terminal sends the first indication information to the first network side device, so that the first network side device can know the association between the reference signal for uplink positioning and the TEG, and/or the association between the positioning measurement result and the TEG, and eliminate the Rx/Tx timing error based on the correlation during positioning, so as to improve the positioning accuracy. Herein, the first network side device may be a location server.

For example, in downlink positioning, the same UE receives Positioning Reference Signals (PRS) from multiple TRPs, and obtains multiple DownLink (DL) measurement results. If multiple DL measurement results can be associated with the same UE Rx Timing Error Group (TEG), a subtraction operation can be performed when processing multiple DL measurement results to eliminate the same UE Rx timing error. Then, when the UE reports the DL measurement result to the first network side device (such as a Location Management Function (LMF)), it can indicate the association between the DL measurement result and the UE Rx TEG, so as to assist the first network side device to complete further positioning calculation.

Similarly, in uplink positioning, when the UE sends a channel Sounding Reference Signal (SRS), it can indicate the association between the SRS and the Tx TEG. For downlink+uplink positioning (such as RTT positioning), the UE reports the measurement result of the Rx-Tx time difference, and can provide the relationship between the measurement result and the Tx TEG and/or Rx TEG, or the relationship between the measurement result and the RxTx TEG.

In addition to the UE, on the TRP side, the TRP can also indicate the relationship between TEG (Rx TEG and/or Tx TEG) on the TRP side and the measurement result, and/or the relationship between the TEG (Rx TEG and/or Tx TEG) and the reference signal.

In this embodiment, TEG can be Tx TEG, Rx TEG, RxTx TEG, or {Rx TEG, Tx TEG}. The correlation can be represented by the associated TEG ID, or SRS or positioning measurement results of the same TEG are divided into one group, or in other manners.

In some embodiments, the association between the reference signal for uplink positioning and the TEG includes at least one of the following:

association between the reference signal for uplink positioning and a UE Tx TEG;
    association between the reference signal for uplink positioning and a UE RxTx TEG; or
    association between the reference signal for uplink positioning and UE {Rx TEG, Tx TEG}.

In some embodiments, the association between the positioning measurement result and the TEG includes at least one of the following:

association between the positioning measurement result and a UE Rx TEG;
    association between the positioning measurement result and a UE RxTx TEG; or association between the positioning measurement result and UE {Rx TEG, Tx TEG}.

In some embodiments, the method further includes:

obtaining, by the terminal, second indication information, where the second indication information is used to indicate a signaling mode for sending the first indication information, where the signaling mode includes one of the following:

sending, by the terminal, the first indication information to the first network side device; or sending, by the terminal, the first indication information to a second network side device, and sending, by the second network side device, the first indication information to the first network side device.

In some embodiments, the 'sending, by the terminal, the first indication information to a second network side device, and sending, by the second network side device, the first indication information to the first network side device' may also be expressed as 'sending, by the terminal, the first indication information to the second network side device'. This is because the terminal only needs to care about which network side device the first indication information is sent to, and does not need to care about the behavior of the network side device after sending the information to the network side device.

In this way, the terminal sends the first indication information to the first network side device in a manner indicated by the second indication information. In some embodiments, the terminal may directly send the first indication information to the first network side device; it may also send the first indication information to the second network side device, and the second network side device sends the first indication information to the first network side device. The first network side device is a location server, such as an LMF, and the second network side device is a base station, including at least one of a serving gNB or a neighboring cell gNB. In some embodiments, the terminal may directly send the first indication information to the first network side device through an LPP message; the terminal may send the first indication information to the second network side device in a manner including but not limited to at least one of RRC, a MAC CE, or a UCI. In some embodiments, which message the terminal uses to send the first indication to the first network side device or the second network side device may be determined by using at least one method such as network indication, protocol agreement, and UE selection.

The terminal receives the second indication information when the first indication information is used to indicate at least one of the association between the reference signal for uplink positioning and the timing error group TEG; or the association between the positioning measurement result and the TEG.

The second indication information may be sent by the first network side device, or may be sent by the second network side device.

In addition, in some embodiments, before the terminal sends the first indication information, the method further includes:

obtaining, by the terminal, TEG level information; and determining, by the terminal, the first indication information according to the TEG level information.

In this way, after obtaining the TEG level information, the terminal determines valid first indication information according to the TEG level information.

Herein, the TEG level information may also be referred to as a TEG calibration level, and the obtaining method may include at least one of the following: independently determined by the terminal, agreed upon by a protocol, or (preconfigured) configured by the network.

In some embodiments, the TEG level information includes at least one mapping relationship, and each mapping relationship includes at least one of the following:

a TEG level identifier;

a timing error threshold corresponding to the TEG level;

a timing error difference threshold corresponding to the TEG level;

a positioning accuracy requirement corresponding to the TEG level; or configuration information of reference signal for positioning corresponding to the TEG level.

The TEG level identifier indicates the level of the TEG, for example: L1.

The timing error threshold may be a range of the timing error, a boundary of the timing error, or a maximum value and/or a minimum value of the timing error. In some embodiments, the timing error threshold may also be a timing error statistical characteristic threshold, including but not limited to at least one of a mean value, a variance, or a covariance. Similar to the timing error threshold, the timing error difference threshold can be the range of a timing error difference, the boundary of a timing error difference, or the maximum value and/or minimum value of a timing error difference, and can also be a timing error difference statistical characteristic threshold. Therefore, if the timing error/ timing error difference of the two transmissions is less than (or does not exceed, or meets) the corresponding threshold, it can be considered that the timing error of the two transmissions belongs to one TEG. Taking the timing error difference as an example, when the timing error difference is known (or roughly known), that the timing error difference of the two transmissions is less than (or does not exceed) this threshold (that is, the timing error difference threshold) can be considered as that the timing error of two transmissions belongs to one TEG. For example, the measurement result whose Rx timing error difference is smaller than this threshold can be in one Rx TEG; the uplink reference signal whose Tx timing error difference is smaller than this threshold can be in one Tx TEG; the measurement result and/or the uplink reference signal whose Rx+Tx timing error difference is smaller than this threshold can be in one RxTx TEG.

The positioning accuracy requirement includes at least one of the accuracy level or the confidence level. The mapping between the positioning accuracy requirement and the TEG level identifier includes at least one one-to-one correspondence, one-to-many correspondence, or many-to-one correspondence.

The configuration information of reference signal for positioning includes but is not limited to at least one of the following: bandwidth, such as PRS bandwidth; repetition, such as PRS repetition; or subcarrier spacing.

In this way, the TEG level information can be implemented as follows: the threshold of timing error difference at L1 level is [x1] ns; the threshold of timing error difference at L2 level is [x2] ns. In some embodiments, the TEG level information is implemented as follows: for a TEG level of L1, the corresponding positioning accuracy requirement is [y1] m.

For example, the protocol specifies or network (precon-figures) configures that TEG level information is shown in Table 1 below. The timing error difference is used as an example:

TABLE 1

| TEG level identifier | Timing error difference margin | Positioning accuracy requirement |
|---|---|---|
| L0 | <[2 ns] | <[0.2 m] |
| L1 | <[5 ns] | <[0.5 m] |
| L2 | <[20 ns] | <[10 m] |
| L3 | <[100 ns] | <[50 m] |
| . . . | . . . | . . . |

In Table 1, a row is a mapping relationship. When the accuracy requirement is less than [0.2 m], the corresponding timing error difference margin should be less than [2 ns], corresponding to TEG level L0.

When the accuracy requirement is less than [0.5 m], the corresponding timing error difference margin should be less than [5 ns], corresponding to TEG level L1.

In addition, in this embodiment, the method further includes:

sending, by the terminal, TEG capability information;

where the TEG capability information indicates a mapping relationship, and each mapping relationship includes at least one of the following:

a TEG level identifier;

a timing error threshold corresponding to the TEG level;

a timing error difference threshold corresponding to the TEG level;

a positioning accuracy requirement corresponding to the TEG level;

configuration information of reference signal for positioning corresponding to the TEG level;

a statistical characteristic parameter of a timing error corresponding to the TEG level;

a statistical characteristic parameter of a timing error difference corresponding to the TEG level; or a number of TEGs corresponding to the TEG level.

Herein, the TEG level identifier, the timing error threshold, the timing error difference threshold, the positioning accuracy requirement, and the configuration information of reference signal for positioning are as described above, and will not be repeated herein. The number of TEGs corresponding to the TEG level is the number of TEGs that can exist for the same TEG level. The statistical characteristic parameter includes, but is not limited to, one of the following: mean, variance, covariance, statistical distribution type, or the like.

For example, the TEG capability information is shown in Table 2 below. The timing error difference is used as an example:

TABLE 2

| TEG level identifier | Timing error difference margin | Number of TEGs |
|---|---|---|
| L0 | <[2 ns] | . . . |
| L1 | <[5 ns] | 4 |
| L2 | <[20 ns] | 2 |
| L3 | <[100 ns] | 1 |
| . . . | . . . | . . . |

In Table 2, a row is a mapping relationship. From the content of Table 2, the L0 level is not supported by the UE.

For L1 level, only when the timing error difference between two transmissions is less than [20 ns], it can belong to TEG, and the number of TEGs that the UE can recognize is 4.

For L2 level, only when the timing error difference between two transmissions is less than [100 ns], it can belong to 1 TEG, and the number of TEGs that the UE can recognize is 2.

For L3 level, only when the timing error difference between two transmissions is less than [100 ns], it can belong to 1 TEG, and the number of TEGs that the UE can recognize is 1.

If the protocol stipulates or the network (preconfigures) configures the timing error difference threshold corresponding to the TEG level, this item may not be included in each mapping relationship of the TEG capability information. Of course, L0 level is not supported by the UE, and therefore, a mapping relationship whose TEG level is L0 can be defaulted in UE capabilities (that is, this row can be deleted in Table 2).

In some embodiments, when the UE does not support 'obtaining timing error difference', the UE does not provide the mapping relationship shown in Table 2.

It should also be known that the TEG capability information may be included in the terminal capability information, and sent together with other information when the terminal reports its own capability information.

In this embodiment, the method further includes:

receiving, by the terminal, request information from the first network side device, where the request information is used to request the terminal to provide the first indication information or TEG capability information.

That is, the terminal sends the first indication information or TEG capability information based on the request of the first network side device. Herein, the request of the first network side device may be direct request by the first network side device, or indirect request by the first network side device. The direct request means that the first network side device directly sends the request information; the indirect request means that the first network side device sends the request message to the second network side device, and then the second network side device sends the request message to the terminal. It should be understood that the indirect request ma also be equivalent to a request from the second network side device.

In some embodiments, the request information includes at least one of the following:

a request identifier;

a TEG level identifier;

a target timing error threshold;

a target timing error difference threshold;

a positioning accuracy requirement; or a TEG capability information request.

Herein, the request identifier is used to indicate the purpose of the request information, such as requesting the terminal to provide the first indication information, or requesting the terminal to provide TEG capability information, and the request identifier can also be implemented by a request instruction. The TEG level identifier can be used to request the terminal to provide the relationship between the reference signal for uplink positioning and the TEG, and/or the relationship between the positioning measurement result and the TEG at a corresponding TEG level; or request the terminal to provide the relationship between the reference signal for uplink positioning and the TEG and/or the relationship between the positioning measurement result and the TEG at a level lower (or not higher) or higher (or not lower) than a corresponding TEG level. In some embodiments, the TEG level identifier may be used to request the terminal to provide at least one of a timing error threshold, a timing error difference threshold, a positioning accuracy requirement, or configuration information of reference signal for positioning at a corresponding TEG level. The target timing error threshold is a timing error threshold when the terminal determines the TEG, the target timing error difference threshold is a timing error difference threshold when the terminal determines the TEG, the specific implementation of the target timing error threshold is that of the above-mentioned timing error threshold, and the specific implementation of the target timing error difference threshold is that of the above-mentioned timing error difference threshold, which will not be repeated herein. The positioning accuracy requirement includes at least one of the accuracy level or the confidence level, and is used to request the terminal to provide the first indication information corresponding to the positioning accuracy requirement, and assist the terminal in determining the TEG group. When the request is used to request a TEG capability, the TEG level identifier, the target timing error threshold, the target timing error difference threshold or the positioning accuracy requirement can be used to request the TEG level identifier, target timing error threshold, target timing error difference threshold, the TEG capability of the terminal under the positioning accuracy requirement, such as whether the terminal supports TEG and/or the number of supported TEGs and/or the timing error (difference) statistical characteristic.

In some embodiments, the request information is sent by at least one of the following:

a long term evolution positioning protocol LPP message;

a new radio positioning protocol NRPPa message;

a radio resource control RRC message;

a media access control control element MAC CE message;

downlink control information DCI; or a broadcast message.

Hereinafter, an example is used to illustrate the sending method of the request information: Case 1: The request information can be directly sent from the location server LMF to the UE through the LPP message. Case2: The request information can be sent by the location server LMF to the serving gNB through NRPPa, and then the serving gNB sends it to the UE through at least one of signaling such as RRC, MAC CE, DCI or broadcast message.

In some embodiments, if the positioning accuracy requirement is low, such as lower than the preset positioning accuracy threshold, the request information can be defaulted; and/or if the UE supports only one TEG-under the TEG level requested by the network side device, or the UE supports only one TEG, or the UE does not support TEG, the request information can be defaulted; and/or if the configuration of the reference signal for positioning (bandwidth of downlink positioning reference signal or bandwidth of reference signal for uplink positioning) meets a certain threshold, the request information can be defaulted. The configuration of the reference signal for positioning includes but is not limited to at least one of the following: bandwidth, repetition of reference signal for positioning subcarrier spacing of reference signal for positioning, period of reference signal for positioning, or the like. For example, when the configuration of the reference signal for positioning is the bandwidth of reference signal of positioning, and the bandwidth of reference signal for positioning is smaller than a certain threshold, the request information may be defaulted. The threshold may be determined according to at least one method of the network indication, protocol agreement, or terminal selection.

Under different positioning accuracy requirements, the TEG information provided by the UE may be different. For example: when the positioning accuracy requirement is not high, the UE may not provide the first indication information of the TEG, or the UE may provide loosely calibrated first indication information of the TEG; when the positioning accuracy requirement is higher, the UE needs to provide strictly calibrated first indication information of the TEG. In order to avoid that the request information may not include the positioning accuracy requirement and the terminal cannot provide applicable first indication information, in some embodiments, before the terminal sends the first indication information, the method may further include:

receiving, by the terminal, the positioning accuracy requirement of the first network side device.

Herein, the positioning accuracy requirement is used to assist the terminal in reporting the first indication information. The positioning accuracy requirement may be included in a location Quality of Service (QoS) indication, and the QoS indication includes at least one of a positioning accuracy requirement, a delay requirement, or a QoS class (LCS QoS class). Therefore, the received positioning accuracy requirement may be used as TEG level information to determine the first indication information. In some embodiments, receiving the positioning accuracy requirement of the first network side device by the terminal is applicable to at least one of downlink positioning methods (such as DL-TDOA positioning method), uplink positioning methods (such as UL-TDOA positioning method), or downlink+uplink positioning methods (such as Multi-RTT positioning method).

In some embodiments, if the positioning accuracy requirement is low, such as lower than the preset positioning accuracy threshold, the terminal may not provide the first indication information; and/or if the UE supports only one TEG under the TEG level requested by the network side device, or the UE supports only one TEG, or the UE does not support TEG, the terminal may not provide the first indication information; and/or if the configuration of the reference signal for positioning (bandwidth of downlink positioning reference signal or bandwidth of reference signal for uplink positioning) meets a certain threshold, the terminal may not provide the first indication information. The configuration of the reference signal for positioning includes but is not limited to at least one of the following: bandwidth, repetition of reference signal for positioning, subcarrier spacing of reference signal for positioning, period of reference signal for positioning, or the like. For example, when the configuration of the reference signal for positioning is the bandwidth of signal for positioning reference, and the bandwidth of signal for positioning reference is smaller than a certain threshold, the request information may be defaulted. The threshold may be determined according to at least one method of the network indication, protocol agreement, or terminal selection.

In some embodiments, the first indication information is also used to indicate the TEG level of the TEG.

In this way, when the first indication information indicates the association between the reference signal for uplink positioning and the TEG, and/or the association between the positioning measurement result and the TEG, the TEG level of the TEG in the correlation is indicated. For example, the request information includes a TEG level identifier. When requesting, from the terminal, the first indication information of a TEG not lower than the level corresponding to the TEG level identifier, the first indication information indicates the TEG level of the TEG. If the terminal selects a TEG level that meets the requirement, corresponding first indication information is provided.

In this embodiment, the first indication information is used to indicate the relationship between the positioning measurement result and the TEG, and when the positioning measurement result is a time difference between sending and receiving, the TEG associated with the time difference between sending and receiving corresponds to one or more resources of reference signal for uplink positioning.

Herein, the TEG associated with the time difference between sending and receiving is the UE RxTx TEG or {Rx TEG, Tx TEG}. When the positioning measurement result is the time difference between sending and receiving (Rx-Tx time difference), the terminal sends first indication information to indicate the association between the positioning measurement result and the UE RxTx TEG or {Rx TEG, Tx TEG}. Herein, the UE RxTx TEG corresponds to one or more resources of reference signal for uplink positioning, or the Tx TEG in {Rx TEG, Tx TEG} corresponds to one or more resources of reference signal for uplink positioning.

In some embodiments, the one or more resources of reference signal for uplink positioning include at least one of the following:

a resource of a reference signal for uplink positioning transmission occasion closest to a current measurement moment;

resources of one or more preset transmission occasions of reference signal for uplink positioning; or resources of one or more transmission occasions of reference signal for uplink positioning within a first time window.

The current measurement time is the time corresponding to the Rx-Tx time difference measurement, or the current measurement time corresponds to the Rx-Tx time difference measurement, or corresponds to the Rx-Tx time difference measurement instance, or corresponds to a PRS resource set instance associated with the Rx-Tx time difference measurement, or corresponds to the moment of the Rx time or Tx time in Rx-Tx time difference measurement.

The transmission occasion may also be replaced with other manners such as transmission period and transmission instance. Taking SRS as an example, an SRS transmission occasion, an SRS occasion, an SRS transmission instance, an SRS instance, and so on may be used.

In some embodiments, the reference signal for uplink positioning transmission occasion closest to the current measurement may be determined before the current measurement moment, or may be determined after the current measurement moment, or may be determined at a time not limited to before and after the current measurement time, so that the reference signal for uplink positioning transmission occasion closest to the current measurement can be before the current measurement time or after the current measurement time.

In some embodiments, the resources of one or more preset transmission occasions of reference signal for uplink positioning are determined by at least one of network indication, protocol agreement, or terminal selection.

In some embodiments, the first time window may include the current measurement moment. That is, the first time window includes the Rx-Tx time difference measurement.

In some embodiments, the first time window may be determined by at least one of protocol agreement, network instruction, or terminal selection.

In some embodiments, the one or more transmission occasions of reference signal for uplink positioning in the first time window include at least one of the following:

one or more transmission occasions of reference signal for uplink positioning closest to the current measurement moment in the first time window;

transmission occasions of reference signal for uplink positioning specified in the first time window; or any transmission occasion of reference signal for uplink positioning in the first time window.

The one or more transmission occasions of reference signal for uplink positioning closest to the current measurement moment in the first time window may be limited to before or after the current measurement moment, or may not be limited to before and after the current measurement moment, which is the same as the above content and will not be repeated herein.

In some embodiments, the first time window is consistent with (or the same as, or related to) time window A. Time window A is described as follows: when gNB or TRP performs uplink measurement (such as measures a reference signal for uplink positioning), the network side device (such as LMF) configures time window A, and gNB or TRP reports the measurement result (measurement result such as RTOA, UL RSRP, and/or gNB Rx-Tx time difference measurements) in time window A. Time window A includes at least one gNB/TRP measurement instance, and each measurement instance includes at least one measurement occasion of reference signal for uplink positioning (such as SRS measurement time occasions).

In this embodiment, the first indication information further includes consistency indication information of the TEG, and the consistency indication information indicates whether TEG information under the same TEG identifier at different times is consistent.

For example, the consistency indication information may be: TEG information under the same TEG identifier at different times changes, or TEG information under the same TEG identifier cannot maintain consistency.

Herein, the TEG information corresponding to the same TEG ID at different times has changed (that is, the range/size of the timing error corresponding to the TEG under the same TEG identifier has changed), and the network cannot assume that the same TEG ID at different times corresponds to the same TEG. In other words, the timing error of the TEG corresponding to the same TEG ID at different times has changed (or at least one of the size, range and statistical characteristic of the timing error has changed). For example, the TEG 1 hour ago and the TEG 1 hour later cannot be regarded as the same TEG, even if the TEG ID is the same. The different moments may be different measurement instances, different measurement occasions, or different instances or occasions of reference signal for uplink positioning, or adjacent measurement instances, adjacent measurement occasions, or adjacent instances or occasions of reference signal for uplink positioning.

In some embodiments, the consistency indication information of the TEG may also be indicated by other indication information, where the other indication information may be different from the first indication information. In some embodiments, other indication information may be before or after the first indication information.

In this embodiment, during the time during which the consistency of the TEG information is maintained, the first indication information further includes at least one of the following:

change information of the relationship between the positioning measurement result and the TEG; or change information of the association between the reference signal for uplink positioning and the TEG.

Herein, taking the SRS as an example, the change information may be implemented as: Tx TEGs associated with one or more SRS resources in two SRS instances have changed, for example, the Tx TEG ID has changed. In SRS occasion X, SRS resource 0 is associated with Tx TEG0, and SRS resource 1 is associated with Tx TEG1. In SRS occasion X+1, the Tx TEG associated with SRS has changed, for example, SRS resource 0 changes to be associated with Tx TEG1 and SRS resource 1 changes to be associated with Tx TEG0. This TEG change may be caused by switching the panel by the UE.

The time during which the consistency of the TEG information is maintained is the valid time during which the consistency of the TEG information is maintained under the same TEG identifier at different times.

That is, during the time when the consistency of the TEG information is maintained, the terminal indicates the change information of the association between the positioning measurement result and the TEG, and/or the change information of the association between the reference signal for uplink positioning and the TEG. In other words, only within the time when the consistency of the TEG information is maintained, indicating the change of the correlation of the TEG by the terminal is valid. In other words, the valid time for the terminal to indicate the change of the correlation of the TEG is equal to or not longer than the time during which the consistency of the TEG information is maintained.

In some embodiments, the change information of the correlation of the TEG may also be indicated by other indication information, where the other indication information may be different from the first indication information. In some embodiments, other indication information may be before or after the first indication information.

In some embodiments, the first indication information is used to indicate the association between the positioning measurement result and the TEG, and when the positioning measurement result is obtained based on measurement of reference signal for positioning, the first indication information indicates association between positioning measurement results of multiple resources of reference signal for positioning under one TRP and at least one TEG. In the association between the measurement results of multiple resources of reference signal for positioning under one TRP and at least one TEG, each TEG is associated with a measurement result of at least one resource of reference signal for positioning.

Herein, the positioning measurement result is obtained based on measurement of reference signal for positioning, and the reference signal for positioning may be a downlink PRS.

In some embodiments, the multiple resources of reference signal for positioning satisfy at least one of the following conditions:

belonging to a same resource set of reference signal for positioning;

belonging to a same positioning frequency layer;

falling within a range of a second time window; or a distance in time is smaller than a distance threshold.

Herein, the second time window is determined by at least one of network indication, protocol agreement, or terminal selection, for example, multiple resources of reference signal for positioning are located in the same measurement time window. The distance in time being smaller than the distance threshold means that among the multiple resources of reference signal for positioning (such as PRS resources), the distance between the first PRS resource and the last PRS resource is smaller than the distance threshold.

By applying the method of the embodiment of the present application, the terminal obtains a mapping relationship between at least one TEG level, the timing error difference threshold corresponding to the TEG level, and the positioning service accuracy requirement through one of independent determination, protocol agreement, and network (pre-configuration) configuration. The timing error difference threshold corresponding to the TEG level can be used by the UE to determine the TEG group, that is, when the timing error difference of the two transmissions is less than (or does not exceed) this threshold, the timing error of the two transmissions can be considered to belong to one TEG.

By applying the method of the embodiment of the present application, the terminal may indicate the supported TEG level and the corresponding number of supported TEGs under the TEG level.

By applying the method of the embodiment of the present application, the terminal receives the request information sent by the network side, including: a TEG level identifier (TEG request instruction), a TEG timing error difference threshold, and a positioning service accuracy requirement. It is used to request the UE to provide the TEG information required by the network.

By applying the method of the embodiment of the present application, the terminal receives the positioning service accuracy requirement indicated by the network side, to assist the terminal in determining TEG groups, especially in UL-TDOA positioning.

As shown in FIG. 4, the positioning processing method of the embodiment of the present application includes:

Step 401: A first network side device receives first indication information.

Step 402: The first network side device performs positioning calculation according to the first indication information.

The first indication information is used to indicate at least one of the following:

association between a reference signal for uplink positioning and a TEG; or association between a positioning measurement result and a TEG.

The first network side device can know the association between the reference signal for uplink positioning and the TEG, and/or the association between the positioning measurement result and the TEG based on the received first indication information, and then eliminate the Rx/Tx timing error based on the correlation during positioning calculation by using the first indication information, to improve positioning accuracy.

In some embodiments, the method further includes:

The first network side device receives TEG capability information.

The TEG capability information indicates at least one mapping relationship, and each mapping relationship includes at least one of the following:

a TEG level identifier;

a timing error threshold corresponding to the TEG level;

a timing error difference threshold corresponding to the TEG level;

a positioning accuracy requirement corresponding to the TEG level;

configuration information of reference signal for positioning corresponding to the TEG level;

a statistical characteristic parameter of a timing error corresponding to the TEG level;

a statistical characteristic parameter of a timing error difference corresponding to the TEG level; or a number of TEGs corresponding to the TEG level.

In some embodiments, the method further includes:

sending, by the first network side device, request information, where the request information is used to request the terminal to provide the first indication information or TEG capability information.

In some embodiments, the request information includes at least one of the following:

a request identifier;

a TEG level identifier;

a target timing error threshold;

a target timing error difference threshold;

positioning accuracy requirements; or a TEG capability information request.

In some embodiments, the method further includes:

sending, by the first network side device, a positioning accuracy requirement.

In some embodiments, the method further includes:

sending, by the first network side device, second indication information, where the second indication information is used to indicate a signaling mode for sending the first indication information, where the signaling mode includes one of the following:

sending, by the terminal, the first indication information to the first network side device; or sending, by the terminal, the first indication information to a second network side device, and sending, by the second network side device, the first indication information to the first network side device.

The first indication information is also used to indicate the TEG level of the TEG.

In some embodiments, the first indication information is used to indicate the relationship between the positioning measurement result and the TEG when the positioning measurement result is a time difference between sending and receiving, the TEG associated with the time difference between sending and receiving corresponds to one or more resources of reference signal for uplink positioning.

In some embodiments, the one or more resources of reference signal for uplink positioning include at least one of the following:

a resource of a reference signal for uplink positioning transmission occasion closest to a current measurement moment;

resources of one or more preset transmission occasions of reference signal for uplink positioning; or resources of one or more transmission occasions of reference signal for uplink positioning within a first time window.

In some embodiments, the one or more transmission occasions of reference signal for uplink positioning in the first time window include at least one of the following:

one or more transmission occasions of reference signal for uplink positioning closest to the current measurement moment in the first time window;

transmission occasions of reference signal for uplink positioning specified in the first time window; or any transmission occasion of reference signal for uplink positioning in the first time window.

In some embodiments, the first time window includes the current measurement moment.

In some embodiments, the first indication information further includes consistency indication information of the TEG, and the consistency indication information indicates that consistency of TEG information under the same TEG identifier at different times changes.

In some embodiments, the first indication information also includes at least one of the following:

change information of the relationship between the positioning measurement result and the TEG; or change information of the association between the reference signal for uplink positioning and the TEG.

In some embodiments, the first indication information includes the change information within a time during which the consistency of the TEG information is maintained.

In some embodiments, the first indication information is used to indicate the association between the positioning measurement result and the TEG, and when the positioning measurement result is obtained based on measurement of reference signal for positioning, the first indication information indicates association between positioning measurement results of multiple resources of reference signal for positioning under one TRP and at least one TEG. In the association between the measurement results of multiple resources of reference signal for positioning under one TRP and at least one TEG, each TEG is associated with a measurement result of at least one resource of reference signal for positioning.

In some embodiments, the multiple resources of reference signal for positioning satisfy at least one of the following conditions:

belonging to a same resource set of reference signal for positioning;

belonging to a same positioning frequency layer;

falling within a range of a second time window; or a distance in time is smaller than a distance threshold.

It should be noted that this method is implemented in cooperation with the positioning processing method executed by the terminal above, and the implementation of the above method embodiment is applicable to this method and can also achieve the same technical effect.

It should also be noted that, for the positioning processing method provided in the embodiment of the present application, the execution subject may be a positioning processing apparatus, or a control module in the positioning processing apparatus for executing the loading positioning processing method. In the embodiment of the present application, the positioning processing method performed by the positioning processing apparatus is taken as an example to describe the positioning processing method provided in the embodiment of the present application.

As shown in FIG. 5, a positioning processing apparatus according to an embodiment of the present application includes:

a sending module 510, configured to send first indication information.

The first indication information is used to indicate at least one of the following:

association between a reference signal for uplink positioning and a timing error group TEG; or association between a positioning measurement result and a TEG.

In some embodiments, the apparatus further includes:

an obtaining module, used to obtain TEG level information; and a determining module, configured to determine the first indication information according to the TEG level information.

In some embodiments, the TEG level information includes at least one mapping relationship, and each mapping relationship includes at least one of the following:

a TEG level identifier;

a timing error threshold corresponding to the TEG level;

a timing error difference threshold corresponding to the TEG level;

a positioning accuracy requirement corresponding to the TEG level; or configuration information of reference signal for positioning corresponding to the TEG level.

In some embodiments, the sending module is also configured to:

send TEG capability information.

The TEG capability information indicates at least one mapping relationship, and each mapping relationship includes at least one of the following:

a TEG level identifier;

a timing error threshold corresponding to the TEG level;

a timing error difference threshold corresponding to the TEG level;

a positioning accuracy requirement corresponding to the TEG level;

configuration information of reference signal for positioning corresponding to the TEG level;

a statistical characteristic parameter of a timing error corresponding to the TEG level;

a statistical characteristic parameter of a timing error difference corresponding to the TEG level; or a number of TEGs corresponding to the TEG level.

In some embodiments, the apparatus further includes:

a request receiving module, configured to receive request information from the first network side device, where the request information is used to request the terminal to provide the first indication information or TEG capability information.

In some embodiments, the request information includes at least one of the following:

a request identifier;

a TEG level identifier;

a target timing error threshold;

a target timing error difference threshold;

positioning accuracy requirements; or a TEG capability information request.

In some embodiments, the apparatus further includes:

a positioning accuracy requirement receiving module, configured to receive a positioning accuracy requirement of the first network side device.

In some embodiments, the first indication information is also used to indicate the TEG level of the TEG.

In some embodiments, the first indication information is used to indicate the relationship between the positioning measurement result and the TEG when the positioning measurement result is a time difference between sending and receiving, the TEG associated with the time difference between sending and receiving corresponds to one or more resources of reference signal for uplink positioning.

In some embodiments, the one or more resources of reference signal for uplink positioning include at least one of the following:

a resource of a reference signal for uplink positioning transmission occasion closest to a current measurement moment;

resources of one or more preset transmission occasions of reference signal for uplink positioning; or resources of one or more transmission occasions of reference signal for uplink positioning within a first time window.

In some embodiments, the one or more transmission occasions of reference signal for uplink positioning in the first time window include at least one of the following:

one or more transmission occasions of reference signal for uplink positioning closest to the current measurement moment in the first time window;

transmission occasions of reference signal for uplink positioning specified in the first time window; or any transmission occasion of reference signal for uplink positioning in the first time window.

In some embodiments, the first time window includes the current measurement moment.

In some embodiments, the apparatus further includes:

an indication receiving module, configured to obtain second indication information, where the second indication information is used to indicate a signaling mode for sending the first indication information, where the signaling mode includes one of the following:

sending, by the terminal, the first indication information to the first network side device; or sending, by the terminal, the first indication information to a second network side device, and sending, by the second network side device, the first indication information to the first network side device.

In some embodiments, the first indication information further includes consistency indication information of the TEG, and the consistency indication information indicates that consistency of TEG information under the same TEG identifier at different times changes.

In some embodiments, the first indication information also includes at least one of the following:

change information of the relationship between the positioning measurement result and the TEG; or change information of the association between the reference signal for uplink positioning and the TEG.

In some embodiments, the first indication information includes the change information within a time during which the consistency of the TEG information is maintained.

In some embodiments, the first indication information is used to indicate the association between the positioning measurement result and the TEG, and when the positioning measurement result is obtained based on measurement of reference signal for positioning, the first indication information indicates association between positioning measurement results of multiple resources of reference signal for positioning under one TRP and at least one TEG. In the association between the measurement results of multiple resources of reference signal for positioning under one TRP and at least one TEG, each TEG is associated with a measurement result of at least one resource of reference signal for positioning.

In some embodiments, the multiple resources of reference signal for positioning satisfy at least one of the following conditions:

belonging to a same resource set of reference signal for positioning;

belonging to a same positioning frequency layer;

falling within a range of a second time window; or a distance in time is smaller than a distance threshold.

The apparatus sends the first indication information to the first network side device, so that the first network side device can know the association between the reference signal for uplink positioning and the TEG, and/or the association between the positioning measurement result and the TEG and eliminate the Rx/Tx timing error based on the correlation during positioning, so as to improve the positioning accuracy. Herein, the first network side device may be a location server.

The positioning processing apparatus in the embodiment of the present application may be a device, a device with an operating system or an electronic device, or may be a component, an integrated circuit, or a chip in a terminal. The apparatus or electronic device may be a mobile terminal, or a non-mobile terminal. Exemplarily, mobile terminals include, but are not limited to, the types of terminals 11 listed above, and non-mobile terminals may be servers, Network Attached Storage (NAS), personal computers (PCs), televisions (TV), teller machines or self-service machines, etc., which are not specifically limited in this embodiment of the present application.

The positioning processing apparatus provided in the embodiment of the present application can implement various processes implemented by the terminal in the method embodiment in FIG. 3, and details are not repeated here to avoid repetition.

As shown in FIG. 6, a positioning processing apparatus according to an embodiment of the present application includes:

a receiving module 610, configured to receive first indication information; and a positioning processing module 620, configured to perform positioning calculation according to the first indication information.

The first indication information is used to indicate at least one of the following:

association between a reference signal for uplink positioning and a TEG; or association between a positioning measurement result and a TEG.

In some embodiments, the receiving module is also configured to:

receive TEG capability information.

The TEG capability information indicates at least one mapping relationship, and each mapping relationship includes at least one of the following:

a TEG level identifier;

a timing error threshold corresponding to the TEG level;

a timing error difference threshold corresponding to the TEG level;

a positioning accuracy requirement corresponding to the TEG level;

configuration information of reference signal for positioning corresponding to the TEG level;

a statistical characteristic parameter of a timing error corresponding to the TEG level;

a statistical characteristic parameter of a timing error difference corresponding to the TEG level; or a number of TEGs corresponding to the TEG level.

In some embodiments, the apparatus further includes:

a request sending module, configured to send request information, where the request information is used to request the terminal to provide the first indication information or TEG capability information.

In some embodiments, the request information includes at least one of the following:

a request identifier;

a TEG level identifier;

a target timing error threshold;

a target timing error difference threshold;

positioning accuracy requirements; or a TEG capability information request.

In some embodiments, the apparatus further includes:

a positioning accuracy requirement sending module, configured to send a positioning accuracy requirement.

In some embodiments, the apparatus further includes:

an indication sending module, configured to send second indication information, where the second indication information is used to indicate a signaling mode for sending the first indication information, and the signaling mode includes one of the following:

sending, by the terminal, the first indication information to the first network side device; or sending, by the terminal, the first indication information to a second network side device, and sending, by the second network side device, the first indication information to the first network side device.

The first indication information is also used to indicate the TEG level of the TEG.

In some embodiments, the first indication information is used to indicate the relationship between the positioning measurement result and the TEG when the positioning measurement result is a time difference between sending and receiving, the TEG associated with the time difference between sending and receiving corresponds to one or more resources of reference signal for uplink positioning.

In some embodiments, the one or more resources of reference signal for uplink positioning include at least one of the following:

a resource of a reference signal for uplink positioning transmission occasion closest to a current measurement moment;

resources of one or more preset transmission occasions of reference signal for uplink positioning; or resources of one or more transmission occasions of reference signal for uplink positioning within a first time window.

In some embodiments, the one or more transmission occasions of reference signal for uplink positioning in the first time window include at least one of the following:

one or more transmission occasions of reference signal for uplink positioning closest to the current measurement moment in the first time window;

transmission occasions of reference signal for uplink positioning specified in the first time window; or any transmission occasion of reference signal for uplink positioning in the first time window.

In some embodiments, the first time window includes the current measurement moment.

In some embodiments, the first indication information further includes consistency indication information of the TEG, and the consistency indication information indicates that consistency of TEG information under the same TEG identifier at different times changes.

In some embodiments, the first indication information also includes at least one of the following:

change information of the relationship between the positioning measurement result and the TEG; or change information of the association between the reference signal for uplink positioning and the TEG.

In some embodiments, the first indication information includes the change information within a time during which the consistency of the TEG information is maintained.

In some embodiments, the first indication information is used to indicate the association between the positioning measurement result and the TEG, and when the positioning measurement result is obtained based on measurement of reference signal for positioning, the first indication information indicates association between positioning measurement results of multiple resources of reference signal for positioning under one TRP and at least one TEG. In the association between the measurement results of multiple resources of reference signal for positioning under one TRP and at least one TEG, each TEG is associated with a measurement result of at least one resource of reference signal for positioning.

In some embodiments, the multiple resources of reference signal for positioning satisfy at least one of the following conditions:

belonging to a same resource set of reference signal for positioning;

belonging to a same positioning frequency layer;

falling within a range of a second time window; or a distance in time is smaller than a distance threshold.

The apparatus can know the association between the reference signal for uplink positioning and the TEG, and/or the association between the positioning measurement result and the TEG, and eliminate the Rx/Tx timing error based on the correlation during positioning, so as to improve the positioning accuracy. Herein, the first network side device may be a location server.

The positioning processing apparatus provided in the embodiment of the present application can implement various processes implemented by the first network side device in the method embodiment in FIG. 4, and details are not repeated here to avoid repetition.

Figure 7:
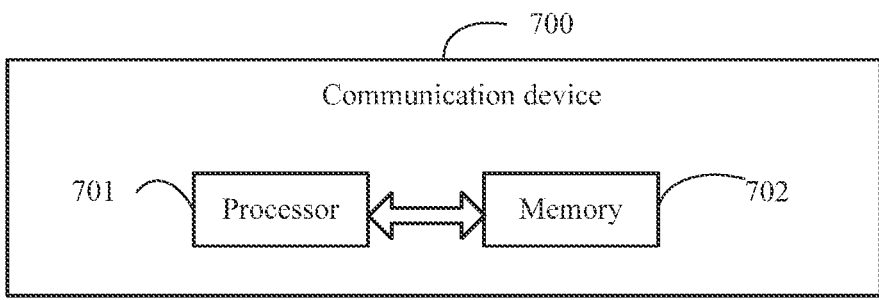
FIG. 7 is a structural diagram of a communication device according to an embodiment of this application.

As shown in FIG. 7, an embodiment of the present application further provides a communication device, including a processor 701, a memory 702, and a program or an instruction stored in the memory 702 and executable on the processor 701. For example, when the communication device 700 is a terminal, when the program or instruction is executed by the processor 701, each process of the embodiment of the foregoing positioning processing method is performed, and the same technical effect can be achieved. When the communication device 700 is a network side device, when the programs or instructions are executed by the processor 701, each process of the above embodiment of the positioning processing method is performed, and the same technical effect can be achieved. To avoid repetition, details are not repeated herein.

The embodiment of the present application also provides a terminal, including a processor and a communication interface, where the communication interface is used to send the first indication information.

The first indication information is used to indicate at least one of the following:

association between a reference signal for uplink positioning and a timing error group TEG; or association between a positioning measurement result and a TEG.

Figure 8:
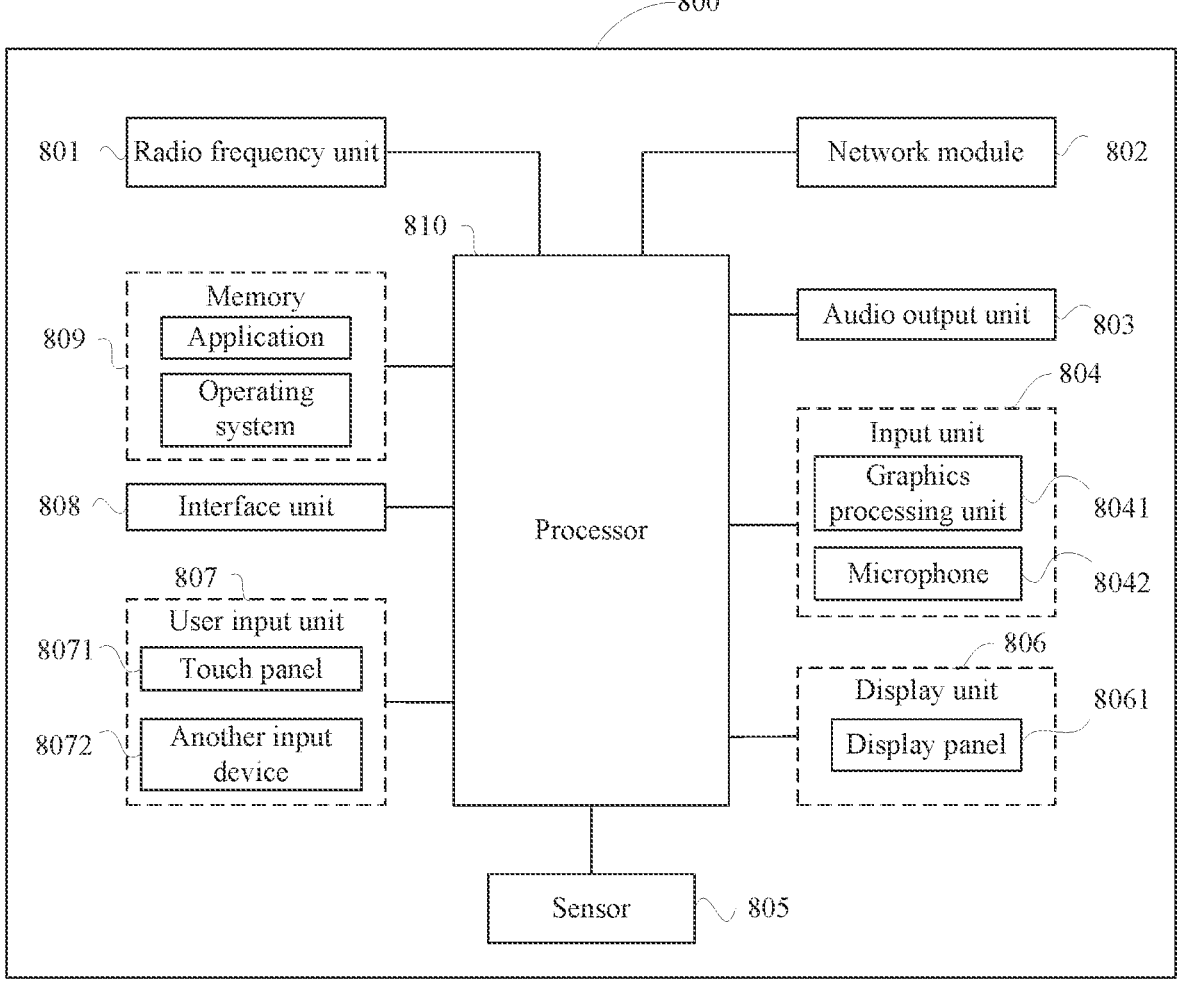
FIG. 8 is a structural diagram of a terminal according to an embodiment of this application.

This terminal embodiment corresponds to the foregoing method embodiment on the terminal side. Each implementation process and implementation of the foregoing method embodiment may be applicable to this terminal embodiment, and a same technical effect can be achieved. FIG. 8 is a schematic structural diagram of hardware of a terminal according to the embodiments of this application.

A terminal 800 includes but is not limited to at least a part of components such as a radio frequency unit 801, a network module 802, an audio output unit 803, an input unit 804, a sensor 805, a display unit 806, a user input unit 807, an interface unit 808, a memory 809, and a processor 810.

A person skilled in the art can understand that the terminal 800 may further include a power supply (such as a battery) that supplies power to each component. The power supply may be logically connected to the processor 810 by using a power supply management system, to implement functions such as charging and discharging management, and power consumption management by using the power supply management system. The terminal structure shown in FIG. 8 constitutes no limitation on the terminal, and the terminal may include more or fewer components than those shown in the figure, or combine some components, or have different component arrangements. Details are not described herein.

It should be understood that in this embodiment of this application, the input unit 804 may include a Graphics Processing Unit (GPU) 8041 and a microphone 8042. The graphics processing unit 8041 processes image data of a static picture or a video obtained by an image capture apparatus (for example, a camera) in a video capture mode or an image capture mode. The display unit 806 may include a display panel 8061. In some embodiments, the display panel 8061 may be configured in a form such as a liquid crystal display or an organic light-emitting diode. The user input unit 807 includes a touch panel 8071 and another input device 8072. The touch panel 8071 is also referred to as a touchscreen. The touch panel 8071 may include two parts: a touch detection apparatus and a touch controller. The another input device 8072 may include but is not limited to a physical keyboard, a functional button (such as a volume control button or a power on/off button), a trackball, a mouse, and a joystick. Details are not described herein.

In this embodiment of this application, the radio frequency unit 801 receives downlink data from a network side device and then sends the downlink data to the processor 810 for processing; and sends uplink data to the network side device. Usually, the radio frequency unit 801 includes but is not limited to an antenna, at least one amplifier, a transceiver, a coupler, a low noise amplifier, a duplexer, and the like.

The memory 809 may be configured to store a software program or an instruction and various data. The memory 809 may mainly include a program or instruction storage area and a data storage area. The program or instruction storage area may store an operating system, and an application or an instruction required by at least one function (for example, a sound playing function or an image playing function). In addition, the memory 809 may include a high-speed random access memory, and may further include a non-volatile memory. The non-volatile memory may be a Read-Only Memory (ROM), a Programmable ROM (PROM), an Erasable PROM (EPROM), an Electrically EPROM (EEPROM), or a flash memory, such as at least one disk storage device, flash memory devices, or other non-volatile solid-state storage devices.

The processor 810 may include one or more processing units. In some embodiments, an application processor and a modem processor may be integrated into the processor 810. The application processor mainly processes an operating system, a user interface, an application, an instruction, or the like. The modem processor mainly processes wireless communication, for example, a baseband processor. It can be understood that, in some embodiments, the modem processor may not be integrated into the processor 810.

The radio frequency unit 801 is configured to send the first indication information.

The first indication information is used to indicate at least one of the following:

association between a reference signal for uplink positioning and a timing error group TEG; or association between a positioning measurement result and a TEG.

The terminal sends the first indication information to the first network side device, so that the first network side device can know the association between the reference signal for uplink positioning and the TEG, and/or the association between the positioning measurement result and the TEG, and eliminate the Rx/Tx timing error based on the correlation during positioning, so as to improve the positioning accuracy.

In some embodiments, the processor 810 is configured to obtain TEG level information; and determine, by the terminal, the first indication information according to the TEG level information.

In some embodiments, the radio frequency unit 801 is also configured to send TEG capability information.

The TEG capability information indicates at least one mapping relationship, and each mapping relationship includes at least one of the following:

a TEG level identifier;

a timing error threshold corresponding to the TEG level;

a timing error difference threshold corresponding to the TEG level;

a positioning accuracy requirement corresponding to the TEG level;

configuration information of reference signal for positioning corresponding to the TEG level;

a statistical characteristic parameter of a timing error corresponding to the TEG level;

a statistical characteristic parameter of a timing error difference corresponding to the TEG level; or a number of TEGs corresponding to the TEG level.

In some embodiments, the radio frequency unit 801 is further configured to receive request information from the first network side device, where the request information is used to request the terminal to provide the first indication information or TEG capability information.

In some embodiments, the radio frequency unit 801 is also configured to receive a positioning accuracy requirement of the first network side device.

In some embodiments, the radio frequency unit 801 is further configured to obtain second indication information, where the second indication information is used to indicate a signaling mode for sending the first indication information, and the signaling mode includes one of the following:

sending, by the terminal, the first indication information to the first network side device; or sending, by the terminal, the first indication information to a second network side device, and sending, by the second network side device, the first indication information to the first network side device.

The embodiment of the present application also provides a network side device, including a processor and a communication interface, where the communication interface is used to receive first indication information; and the processor is configured to perform positioning calculation according to the first indication information.

The first indication information is used to indicate at least one of the following:

association between a reference signal for uplink positioning and a TEG; or association between a positioning measurement result and a TEG.

This network side device embodiment corresponds to the foregoing method embodiment on the network side device. Each implementation process and implementation of the foregoing method embodiment may be applicable to this network side device embodiment, and a same technical effect can be achieved.

Figure 9:
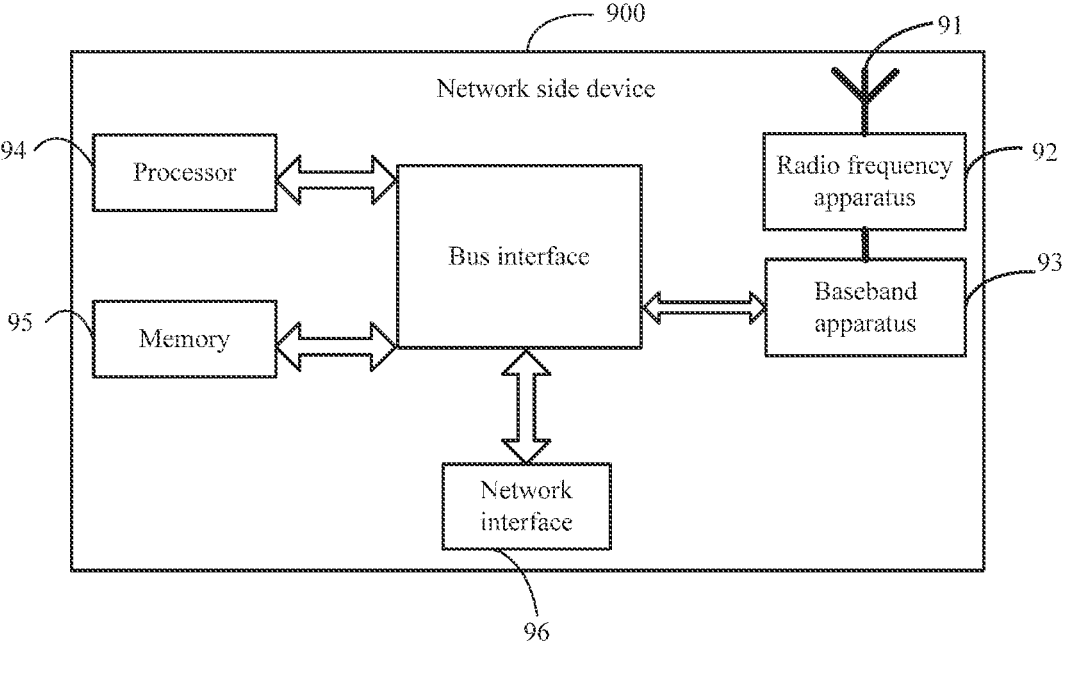
FIG. 9 is a structural diagram of a network side device according to an embodiment of this application.

An embodiment of this application further provides a network side device. As shown in FIG. 9, a network side device 900 includes an antenna 91, a radio frequency apparatus 92, and a baseband apparatus 93. The antenna 91 is connected to the radio frequency apparatus 92. In an uplink direction, the radio frequency apparatus 92 receives information by using the antenna 91, and sends the received information to the baseband apparatus 93 for processing. In a downlink direction, the baseband apparatus 93 processes information that needs to be sent, and sends processed information to the radio frequency apparatus 92. The radio frequency apparatus 92 processes the received information, and sends processed information by using the antenna 91.

The frequency band processing apparatus may be located in the baseband apparatus 93. The method performed by the network side device in the foregoing embodiment may be implemented in the baseband apparatus 93. The baseband apparatus 93 includes a processor 94 and a memory 95.

The baseband apparatus 93 may include, for example, at least one baseband board, where a plurality of chips are disposed on the baseband board. As shown in FIG. 9, one chip is, for example, the processor 94, which is connected to the memory 95, so as to invoke a program in the memory 95 to perform operations of the network side device shown in the foregoing method embodiment.

The baseband apparatus 93 may further include a network interface 96, configured to exchange information with the radio frequency apparatus 92. For example, the interface is a common public radio interface (CPRI).

The network side device in this embodiment of this application further includes an instruction or a program that is stored in the memory 95 and that can be run on the processor 94. The processor 94 invokes the instruction or the program in the memory 95 to perform the method performed by the modules shown in FIG. 6, and a same technical effect is achieved. To avoid repetition, details are not described herein again.

An embodiment of the present application further provides a readable storage medium. The readable storage medium stores a program or an instruction, and when the program or the instruction is executed by a processor, the various processes of the foregoing positioning processing method embodiment is performed and the same technical effects can be achieved. To avoid repetition, details are not described herein again.

The processor is a processor in the terminal in the foregoing embodiment. The readable storage medium includes a computer-readable storage medium, such as a computer Read-Only Memory (ROM), a Random Access Memory (RAM), a magnetic disk, or an optical disc.

An embodiment of the present application further provides a chip, the chip includes a processor and a communication interface, the communication interface is coupled to the processor, and the processor is configured to run programs or instructions to implement each process of the embodiment of the foregoing positioning processing method and the same technical effects can be achieved. To avoid repetition, details are not described herein again.

It should be understood that the chip mentioned in this embodiment of this application may also be referred to as a system-level chip, a system chip, a chip system, or an on-chip system chip.

It should be noted that, in this specification, the term "include", "comprise", or any other variant thereof is intended to cover a non-exclusive inclusion, so that a process, a method, an article, or an apparatus that includes a list of elements not only includes those elements but also includes other elements which are not expressly listed, or further includes elements inherent to such process, method, article, or apparatus. In absence of more constraints, an element preceded by "includes a . . . " does not preclude the existence of other identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. Based on such an understanding, the technical solutions of this application essentially or the part contributing to the prior art may be implemented in a form of a computer software product. The computer software product is stored in a storage medium (such as a ROM/RAM, a hard disk, or an optical disc), and includes several instructions for instructing a terminal (which may be a mobile phone, a computer, a server, an air-conditioner, a network device, or the like) to perform the method described in the embodiments of this application.

The embodiments of this application are described above with reference to the accompanying drawings, but this application is not limited to the above implementations, and the above implementations are only illustrative and not restrictive. Under the enlightenment of this application, those of ordinary skill in the art can make many forms without departing from the purpose of this application and the protection scope of the claims, all of which fall within the protection of this application.

The invention claimed is:

1. A method for positioning processing, comprising:
obtaining, by a terminal, timing error group (TEG) level information, wherein the TEG level information indicates at least one mapping relationship, wherein the at least one mapping relationship comprises at least one of the following:
a timing error threshold corresponding to a TEG level,
a timing error difference threshold corresponding to the TEG level,
a positioning accuracy requirement corresponding to the TEG level, or
configuration information of reference signal for positioning corresponding to the TEG level;
determining, by the terminal, first indication information according to the at least one mapping relationship; and
sending, by the terminal, the first indication information, to a first network side device for the first network side device to perform positioning processing associated with the terminal based on the first indication information,
wherein the first indication information indicates at least one of the following:
an association between a reference signal for uplink positioning and a TEG, or
an association between a positioning measurement result and the TEG.

2. The method according to claim 1, wherein the at least one mapping relationship further comprises:
a TEG level identifier.

3. The method according to claim 1, further comprising:
sending, by the terminal, TEG capability information;

wherein the TEG capability information indicates the at least one mapping relationship, and the at least one mapping relationship comprises at least one of the following:
a TEG level identifier;
a timing error threshold corresponding to the TEG level;
a timing error difference threshold corresponding to the TEG level;
a positioning accuracy requirement corresponding to the TEG level;
configuration information of reference signal for positioning corresponding to the TEG level;
a statistical characteristic parameter of a timing error corresponding to the TEG level;
a statistical characteristic parameter of a timing error difference corresponding to the TEG level; or
a number of TEGs corresponding to the TEG level.

4. The method according to claim 1, further comprising:
receiving, by the terminal, request information from the first network side device, wherein the request information is used to request the terminal to provide the first indication information or TEG capability information.

5. The method according to claim 4, wherein the request information comprises at least one of the following:
a request identifier;
a TEG level identifier;
a target timing error threshold;
a target timing error difference threshold;
positioning accuracy requirements; or
a TEG capability information request.

6. The method according to claim 1, before the terminal sends the first indication information, further comprising:
receiving, by the terminal, the positioning accuracy requirement of the first network side device.

7. The method according to claim 1, wherein the first indication information further indicates the TEG level of the TEG.

8. The method according to claim 1, wherein the first indication information indicates the association between the positioning measurement result and the TEG, wherein the positioning measurement result is a time difference between sending and receiving, the TEG associated with the time difference between sending and receiving corresponds to one or more resources of reference signal for uplink positioning.

9. The method according to claim 8, wherein the one or more resources of reference signal for uplink positioning comprise at least one of the following:
a resource of a reference signal for uplink positioning transmission occasion closest to a current measurement moment;
resources of one or more preset transmission occasions of reference signal for uplink positioning; or
resources of one or more transmission occasions of reference signal for uplink positioning within a first time window.

10. The method according to claim 9, wherein the one or more transmission occasion of reference signal for uplink positioning in the first time window comprise at least one of the following:
one or more transmission occasions of reference signal for uplink positioning closest to the current measurement moment in the first time window;
transmission occasions of reference signal for uplink positioning specified in the first time window; or any transmission occasion of reference signal for uplink positioning in the first time window.

11. The method according to claim 1, further comprising:

obtaining, by the terminal, second indication information, wherein the second indication information indicates a signaling mode for sending the first indication information, wherein the signaling mode comprises one of the following:

sending, by the terminal, the first indication information to the first network side device; or sending, by the terminal, the first indication information to a second network side device, and sending, by the second network side device, the first indication information to the first network side device.

12. The method according to claim 1, wherein the first indication information further comprises consistency indication information of the TEG, and the consistency indication information indicates whether TEG information under the same TEG identifier at different times is consistent.

13. The method according to claim 12, wherein during the time during which the consistency of the TEG information is maintained, the first indication information further comprises at least one of the following:

change information of the association between the positioning measurement result and the TEG; or change information of the association between the reference signal for uplink positioning and the TEG.

14. The method according to claim 1, wherein the first indication information indicates the association between the positioning measurement result and the TEG, and when the positioning measurement result is obtained based on measurement of reference signal for positioning, the first indication information indicates association between positioning measurement results of multiple resources of reference signal for positioning under one TRP and at least one TEG, wherein in the association between the positioning measurement results of the multiple resources of reference signal for positioning under the one TRP and the at least one TEG, each TEG is associated with a positioning measurement result of at least one resource of reference signal for positioning.

15. The method according to claim 14, wherein the multiple resources of reference signal for positioning satisfy at least one of the following conditions:

belonging to a same resource set of reference signal for positioning;

belonging to a same positioning frequency layer;

falling within a range of a second time window; or a distance in time is smaller than a distance threshold.

16. A method for positioning processing, comprising:

receiving, by a first network side device, first indication information from a terminal, wherein the first indication information is determined by the terminal according to at least one mapping relationship of timing error group (TEG) level information, and the at least one mapping relationship comprises at least one of the following:

a timing error threshold corresponding to a TEG level, a timing error difference threshold corresponding to the TEG level, a positioning accuracy requirement corresponding to the TEG level, or configuration information of reference signal for positioning corresponding to the TEG level; and performing, by the first network side device, positioning processing associated with the terminal according to the first indication information;

wherein the first indication information indicates:

an association between a reference signal for uplink positioning and a TEG; and an association between a positioning measurement result and the TEG.

17. A terminal, comprising: a memory storing a computer program; and a processor coupled to the memory and configured to execute the computer program to perform operations comprising:

Obtaining timing error group (TEG) level information, wherein the TEG level information indicates at least one mapping relationship, wherein the at least one mapping relationship comprises at least one of the following:

a timing error threshold corresponding to a TEG level, a timing error difference threshold corresponding to the TEG level, a positioning accuracy requirement corresponding to the TEG level, or configuration information of reference signal for positioning corresponding to the TEG level;

determining first indication information according to the at least one mapping relationship; and sending the first indication information, to a first network side device for the first network side device to perform positioning processing associated with the terminal based on the first indication information, wherein the first indication information indicates at least one of the following:

an association between a reference signal for uplink positioning and a timing error group (TEG); or an association between a positioning measurement result and the TEG.

18. A network side device, comprising: a memory storing a computer program; and a processor coupled to the memory and configured to execute the computer program to perform steps of the positioning processing method according to claim 16.

* * * * *